(12) United States Patent  
Carvin et al.

(10) Patent No.: US 9,056,704 B2
(45) Date of Patent: Jun. 16, 2015

(54) WINE GLASS, METHOD FOR PACKAGING WINE, AND WINE CONTAINER

(75) Inventors: Pascal Carvin, Sollies-Pont (FR);
Christian Mura, Plan-du-Castellet (FR)

(73) Assignee: 1/4 VIN, Sollies-Pont (FR)

( * ) Notice: Subject to any disclaimer, the term of this patent is extended or adjusted under 35 U.S.C. 154(b) by 588 days.

(21) Appl. No.: 13/201,475

(22) PCT Filed: Mar. 11, 2010

(86) PCT No.: PCT/FR2010/000201
§ 371 (c)(1),
(2), (4) Date: Sep. 12, 2011

(87) PCT Pub. No.: WO2010/106239
PCT Pub. Date: Sep. 23, 2010

(65) Prior Publication Data
US 2012/0045554 A1 Feb. 23, 2012

(30) Foreign Application Priority Data

Mar. 16, 2009 (FR) .................................. 09 01210
Mar. 16, 2009 (FR) .................................. 09 01211

(51) Int. Cl.
| B65D 77/00 | (2006.01) |
| B65D 79/00 | (2006.01) |
| A47G 19/22 | (2006.01) |
| B65B 7/28 | (2006.01) |
| B65D 77/20 | (2006.01) |
| B29C 65/00 | (2006.01) |
| B29C 65/02 | (2006.01) |
| B29L 31/00 | (2006.01) |

(52) U.S. Cl.
CPC .......... *B65D 79/005* (2013.01); *A47G 19/2205* (2013.01); *B65B 7/2878* (2013.01); *B65D 77/2032* (2013.01); *B29L 2031/7132* (2013.01); *B29C 66/112* (2013.01); *B29C 66/114* (2013.01); *B29C 66/131* (2013.01); *B29C 66/30223* (2013.01); *B29C 66/53461* (2013.01); *B29C 66/72321* (2013.01); *B29C 66/7392* (2013.01); *B29C 65/02* (2013.01)

(58) Field of Classification Search
CPC ...................... B65D 77/2024; B29C 66/53461
USPC ............. 426/115; 99/275; 220/669, 658, 659, 220/657, 656, 359.4
See application file for complete search history.

(56) References Cited

U.S. PATENT DOCUMENTS

| 6,471,084 B2 * | 10/2002 | Erb .............................. 220/359.4 |
| 2002/0179607 A1 | 12/2002 | Iwasaki et al. |
| 2007/0294983 A1 * | 12/2007 | Carvin ............................ 53/471 |

FOREIGN PATENT DOCUMENTS

| DE | 296 19 269 U1 | 1/1997 |
| EP | 0 943 553 A1 | 9/1999 |

(Continued)

OTHER PUBLICATIONS

One Glass Wine, on line, retrieved on Oct. 3, 2013. Retrieved from the Internet: URL:<http://www.oneglasswine.com/Concept_ogw_us.html>.*

(Continued)

*Primary Examiner* — Rena L Dye
*Assistant Examiner* — Chaim Smith
(74) *Attorney, Agent, or Firm* — Ladas & Parry LLP (57) ABSTRACT

The invention relates to a method of packaging wine in a container essentially consisting of a plastics material glass closed by a lid, wherein a lid is sealed to the rim of the glass and, while sealing the lid, the container is deformed to reduce the volume of the head space.

14 Claims, 6 Drawing Sheets

(56) References Cited

FOREIGN PATENT DOCUMENTS

| EP | 1 235 501 A | 9/2002 |
| EP | 1 681 245 A1 | 7/2006 |
| FR | 2 630 408 A | 10/1989 |
| FR | 2 735 003 A1 | 12/1996 |

OTHER PUBLICATIONS

FR 2 735 003, translation, EPO Machine.*
Office Action dated Nov. 23, 2012 for Application No. CN 201080012102.5 with English translation.

* cited by examiner

WINE GLASS, METHOD FOR PACKAGING WINE, AND WINE CONTAINER

TECHNICAL FIELD

The present invention relates to a wineglass, to a container filled with wine that incorporates this wineglass, and to a method of packaging wine in this glass.

The invention relates in particular to a plastics material glass and to a container that incorporates this glass and is filled with wine packaged in a modified atmosphere.

PRIOR ART

Packaging wine in a sealed drinking glass is described in French patent FR 2 735 003. The container in that patent includes a closure member fitting closely to the wall of the container in order to seal the packaging; the closure member has a plane lower face situated in the vicinity of the free surface of the wine in order to define a residual space of at most two cubic centimeters. The glass is made of glass or plastic.

The choice of such a small residual space (also referred to as a "head space"), although it makes it possible to limit the volume of gas "trapped" in the container, requires the use of a closure member specifically adapted to the shape and the dimensions of the drinking glass concerned, which is costly, makes it difficult to automate closure of the glass by such a member, and may also make it difficult for a consumer of average dexterity to open the container.

The European patent EP 1 235 501 proposes to package wine in a sealed container having overall permeability to oxygen that is sufficiently low to allow long-term storage of the wine contained in the container.

The container is made of glass and is closed by a heat-seal film lid including a layer of aluminum coated with a protection layer.

The wine is packaged in a low-oxygen atmosphere; thus the head space defined by the film lid, the wall of the glass, and the free surface of the wine contains little oxygen, which limits oxidation of the wine.

The head space is at a lower pressure than the outside environment, in particular when the oxygen concentration of the atmosphere in the head space is reduced by injecting an inert gas or gases.

A reduced pressure in the head space (and consequently in the wine) may facilitate the diffusion of oxygen contained in the air around the sealed container through its walls, and in particular through the film of material that seals the film lid to the (drinking) glass, if the film lid and/or the wall of the glass have low permeability to oxygen, and that compromises good storage of the wine.

That reduced pressure may also cause localized (confined or individual) rupture or detachment of the sealing film and/or the film lid, ending confinement of the wine, and causing (micro)leakage of surrounding air into the container, leading to rapid deterioration of the qualities of the wine.

Moreover, reducing the volume of the head space compromises user friendliness when the glass is closed by a plane film lid: there is a greater risk of spilling the wine when peeling off the film lid and when the consumer raises the glass to the lips.

Strengthening the adhesion of the film lid to the edge or rim of the glass by means of a sealing film causes problems: the increased strength of the seal makes it more difficult to detach the film lid and is liable to cause it to tear.

Moreover, increasing for this purpose the area over which the film lid adheres to the rim requires a glass with a thick rim, which reduces the enjoyment of the wine.

Moreover, a sealing film that is thick and/or that extends over a large area of the rim is liable, after detaching the film lid, to leave behind film lid residues that remain attached to the rim, which is also not user friendly.

Another potential problem linked to sealing a film lid to the rim of a glass is the result of a defect in terms of the flatness of the rim: in this situation, closure may be perfect over only a portion of the outline of the rim and may be deficient over a different portion of that outline, thus facilitating the occurrence of leaks between the inside volume of the container and the medium (in particular the air) surrounding the container.

SUMMARY OF THE INVENTION

An object of the invention is to propose a container filled with wine comprising a wineglass closed by a film lid that enables improved storage of the wine and that makes use of the glass by a consumer more user friendly.

An object of the invention is to propose a container filled with wine essentially consisting of a wineglass closed by a film lid, which container is improved and/or remedies at least in part the shortcomings or drawbacks of known containers filled with wine.

An object of the invention is to propose a wineglass adapted to be easily and efficaciously closed by a film lid, which wineglass is improved and/or remedies at least in part the shortcomings or drawbacks of known wineglasses.

An object of the invention is to propose a method of packaging wine in a container essentially consisting of a glass closed by a film lid, which method is improved and/or remedies, at least in part, the shortcomings or drawbacks of known methods of packaging wine.

One aspect of the invention proposes a plastics material glass, in which the upper extremity of the edge (or rim) of the glass comprises an annular thermoplastic material rib and two receiver surfaces (or volumes) lying on either side of the rib and set back from the top of the rib to receive plastics material resulting from flattening of the rib.

In section the rib may have an upside down T shape.

The rim may have a central upper part and two lateral lower parts set back from the central part, above and between the receiver surfaces, which makes it possible to increase the area of contact between the rim and a film of material for sealing a film lid to the rim, without increasing the width (or thickness) of the rim, to increase the resistance to tearing off the film lid, to reduce the oxygen permeability of the connecting area (the sealing film in particular) connecting the rim to the film lid, and to limit or avoid the presence of projecting residues after tearing off the film lid.

Two first substantially plane surfaces of revolution may lie on either side of a central part of the rib and be set back from the top of the rib, and two second substantially plane surfaces of revolution may lie on either side of and are set back from the two first surfaces; connecting surfaces, also of revolution, may each lie between one of the first surfaces and one of the second surfaces, to connect them together in pairs.

The rim may include a peripheral portion projecting relative to the outside face of the lateral wall of the glass to cooperate with the glass to form a ledge or flange adapted to receive the extremity of a holding tool to facilitate manipulation of the glass or a blank for the glass.

The glass may in particular be produced in polyethylene terephthalate (PET) by an injection blow molding process.

Another aspect of the invention proposes a method of packaging wine in a container essentially comprising a plastics material glass closed by a film lid, wherein an inert gas or gases is/are injected into the head space, a film lid is sealed to the rim of the glass and the container is caused to be deformed to reduce the volume of the head space while sealing the film lid, this deformation preferably including plastic deformation of the film lid and/or elastic deformation of the walls of the glass.

The inert gases may comprise carbon dioxide.

In particular, the annular rib on the rim of the glass may be deformed plastically while heat-sealing the film lid.

Another aspect of the invention proposes a container comprising a plastics material glass containing wine and closed by a film lid including a metal layer, wherein the film lid presents (at least) one local deformation adapted to facilitate deformation of a substantial part of the film lid when a sufficient pressure difference is applied between the two main faces of the film lid to facilitate overall deformation of the film lid and to reduce the volume of the head space of the container.

The local deformation of the film lid may exhibit circular symmetry about the longitudinal axis of the glass.

The metal part of film lid may include a plurality of concentric local deformations, each exhibiting circular symmetry.

The deformed part of the film lid may have, in section, a U, V, half-wave, or full-wave shape.

Such local deformation of the film lid may be effected by stamping the film lid or the metal foil used to fabricate it.

Alternatively or additionally, the film lid may include numerous (local) deformations substantially regularly distributed over at least a substantial part of the film lid. In particular, the film lid may include at least ten deformations per square centimeter, the deformations being of substantially identical shape and distributed over at least a surface exhibiting centered symmetry such as a ring.

The distributed local deformations of the film lid may be obtained by embossing at least part of the film lid or the metal foil used to fabricate it.

Although the film lid may be provided with these deformations over the whole of its surface, a peripheral portion (or ring) of the film lid may be free of deformations in order to facilitate deformation of the whole of the film lid without deteriorating the contact and the adhesion of this peripheral portion to the rim via the sealing film.

The glass may include a first wall portion having a first thickness and a second wall portion extending the first wall portion and having a second thickness less than the first thickness, the area of the second wall portion being less than the area of the first wall portion, so as to confer on the glass a capacity for elastic deformation whilst ensuring sufficient protection against diffusion of oxygen through the wall of the glass.

This capacity for elastic deformation may improve the quality of heat-sealing of a film lid to the rim of the glass, in particular in the event of a defect in terms of the parallel relationship between the rim and the head of the heat-sealing tool.

This capacity for elastic deformation may equally make it possible to reduce the volume of the head space during heat-sealing and where appropriate to limit the pressure reduction in the head space when the glass is filled with wine and closed.

The first and second wall portions lie below the rim, the rim generally having a thickness greater than the thickness of the first wall portion.

The ratio of the first thickness to the second thickness may be in a range of approximately 1.1 to approximately 3, 4, or 5 and in particular in a range from approximately 1.3 to approximately 2 or 3.

The ratio of the area of the first wall portion to the area of the second wall portion may be in a range of approximately 1.5 to approximately 10, in particular in a range of approximately 2 to approximately 4.

The second wall portion may project or be recessed relative to the first wall portion, thus forming an enlargement or a reduction, respectively, of the volume defined by the walls of the glass.

The first and second wall portions may extend over surfaces of revolution.

The reduced pressure in the container may be of the order of 0.03 bar to 0.3 bar. The volume of the head space may be in a range of approximately 3% to approximately 30% of the capacity of the glass, in particular in a range of approximately 5% or 6% to approximately 10% of the capacity of the glass.

The invention makes it possible in particular to produce glasses with a capacity of one or more deciliters and containers incorporating these glasses in which the volume of the head space is of the order of approximately 3% to approximately 10%, 20%, or 30% of the capacity of the glass.

Other aspects, features, and advantages of the invention appear in the following description, which refers to the appended figures and illustrates preferred non-limiting embodiments of the invention.

DETAILED DESCRIPTION OF THE INVENTION

Unless indicated explicitly or implicitly to the contrary, elements or members that are structurally or functionally identical or similar are designated by the same references in all the figures.

Referring to FIGS. 1, 2, 6, and 7 in particular, a plastics material glass 20 includes a wall 45 forming the bottom of the glass and a lateral wall 21 extending from the bottom 45 and terminated by a free edge (or rim) 22.

Figure 1:
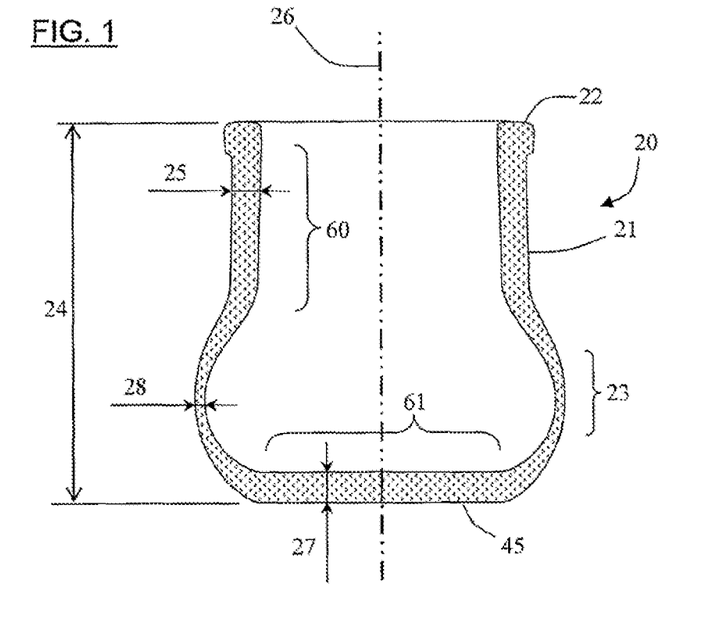
FIG. 1 is a diagrammatic view in section on a diametral plane of a glass of one embodiment of the invention.
Figure 2:
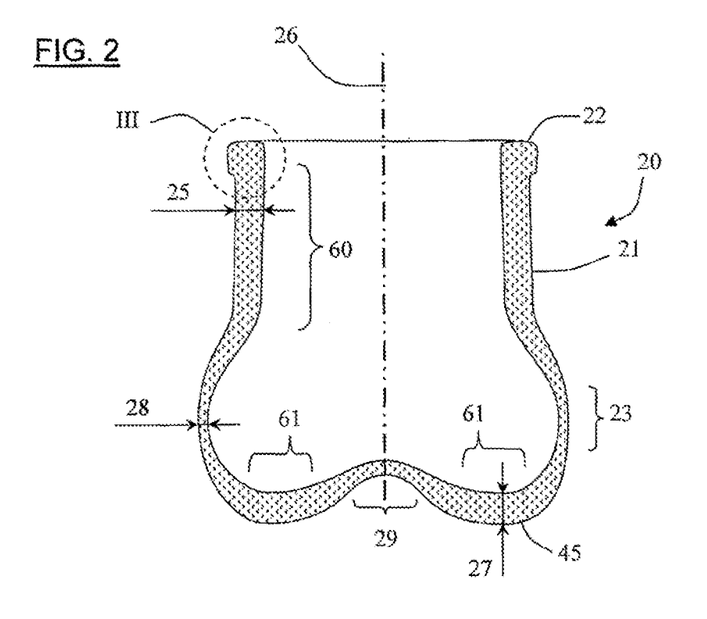
FIG. 2 is a diagrammatic view in section on a diametral plane of a glass of another embodiment of the invention.
Figure 6:
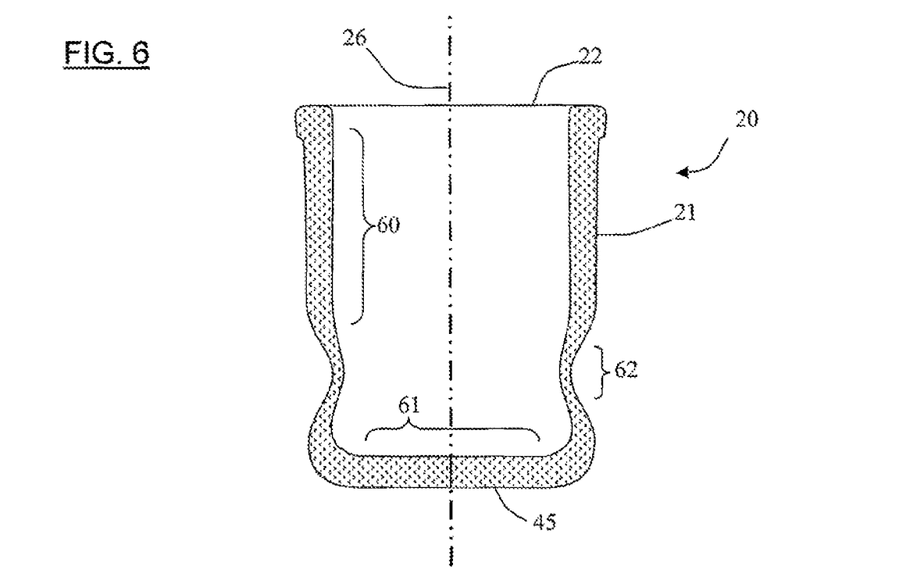
FIG. 6 is a diagrammatic view in section on a diametral plane of a glass of a further embodiment of the invention.

In the configurations shown in FIGS. 1, 2, and 6, the glass 20 and the walls 21, 45 exhibit generally circular symmetry about the vertical longitudinal axis 26 of the glass; in particular, the upper part 60 of the wall 21 may have a cylindrical or frustoconical shape of circular section about an axis 26.

Figure 7:
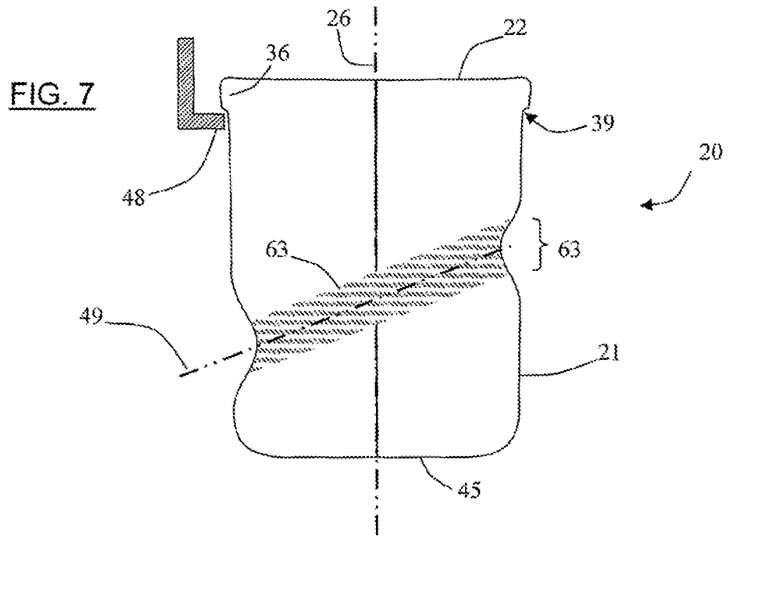
FIG. 7 is a diagrammatic side view of a glass of another embodiment of the invention.

In the configuration shown in FIG. 7, the wall 21 does not have this circular symmetry, a thinner part 63 of this wall lying in a plane, given reference 49 in the figure, that is not orthogonal to the longitudinal axis 26 of the glass.

Referring to FIGS. 1 and 6, the major part 60 of the lateral wall 21 and likewise the major part 61 of the bottom wall 45 have respective thicknesses 25 and 27, that may be of the order of 1 mm to 2.5 mm.

In the configuration shown in FIG. 1, a lower part 23 of the wall 21, which has a thickness 28 less than the thicknesses 25 and 27 of the wall portions 60 and 61, projects outwards from the upper part 60 of the wall 21; this thinner portion 23 connects the portion 60 of the wall 21 to the bottom wall 45 and is the result of a local enlargement of the inside section of the glass.

In contrast, in the configuration shown in FIG. 6, the thinner lower part 62 of the wall 21, which lies between and connects together the bottom wall 45 and the upper part 60 of the wall 21, forms a local depression on the outside face of the lateral wall of the glass and reduces the volume (of the glass) defined by this wall.

In the configuration shown in FIG. 2, the bottom wall 45 also includes a thinner portion 29 that is centrally located and surrounded by the thick wall portion 61.

These thinner wall portions, thickness that may be of the order of 0.5 mm to 1 mm, facilitate substantially elastic deformation of the glass 20, in particular if the glass is subjected to a compression force along its longitudinal axis 26; this makes it possible, notably when sealing a film lid, to reduce the height 24 of the glass, for example by 1% to 2%, and to reduce the volume of the head space.

Figure 3:
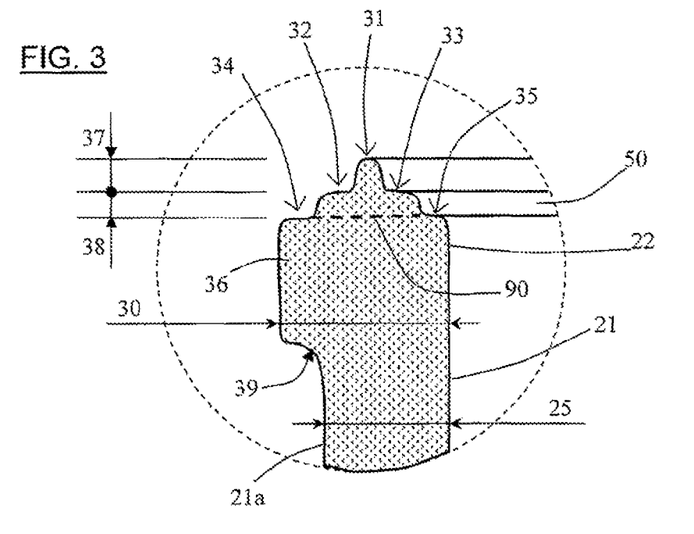
FIG. 3 is a diagrammatic view in section of the rim of the glass shown in FIG. 2 and is a view to a larger scale of the detail III from FIG. 2.

Referring to FIG. 3, the rim 22 includes a peripheral portion 36 projecting from the outside face 21a of the lateral wall 21 and forming a projecting annular flange.

As shown in FIG. 7, this flange 39 may serve as a bearing point to receive the end of a holding tool 48, which facilitates manipulation of the glass or its blank by means of this tool during fabrication of the glass by molding; this fabrication is preferably effected by injection molding a thermoplastic material to obtain a blank for a glass and then by blow molding the blank to obtain the glass.

Referring to FIG. 3, the upper end of the rim 22 includes a rib 90 of upside down T shape that lies above two surfaces 34, 35 of the rim lying on either side of the rib 90. These surfaces 34, 35 are substantially plane and coplanar, i.e. they form part of or extend along a plane orthogonal to the longitudinal axis of the glass.

This configuration confers upon the (diametral) cross-section of the upper end of the rim a stepped shape with three levels and five steps 31 to 35: the faces/surfaces 34, 35 form two first level steps; two other faces/surfaces 32, 33 that are substantially coplanar correspond to the two arms of the T shape and lie above the surfaces 34, 35, forming two second level steps; and a central surface 31 that corresponds to the end of the stem of the T shape and that lies above the surfaces 32, 33 forms a fifth third level step.

The vertical distance 38 between the surfaces 32 and 34 and also between the surfaces 33 and 35 is preferably greater than the vertical distance 37 between the surfaces 32 and 33, and the central surface 31. The vertical distances 37, 38 are preferably less than 1 mm and for example in a range from 0.1 mm to 0.5 mm.

The surface 31 may be substantially plane and orthogonal to the longitudinal axis of the glass or, as shown in FIG. 3, have a rounded profile (in section).

Connecting surfaces such as the surfaces 50 that extend along cylinders whose axis is the longitudinal axis of the glass, for example, connect the surfaces 31 to 35 together in pairs.

Figure 4:
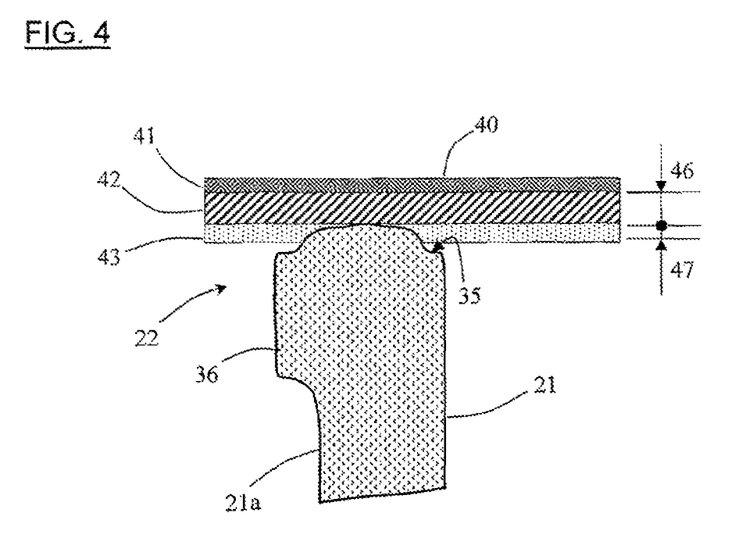
FIG. 4 is a diagrammatic view in section of the rim shown in FIG. 3 after sealing a film lid to the rim.
Figure 5:
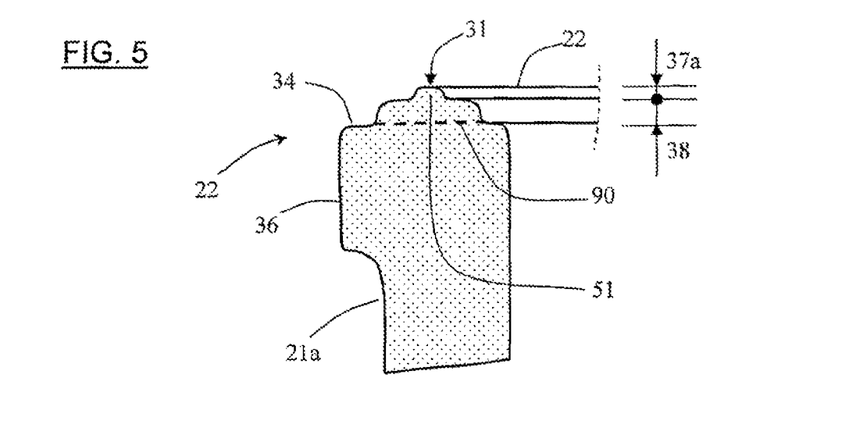
FIG. 5 is a diagrammatic view in section of the rim after tearing off the film lid to consume the wine.

As emerges in particular from a comparison of FIGS. 3 and 4 or of FIGS. 3 and 5, the part 51 of the rib 90 corresponding to the stem of the T shape "disappears": this upper central part 51 of the rib 90, which is subjected to heating and to compression transmitted by the film lid, is softened and melted, at least in part, with the lower part of the rib, which corresponds to the cross-bar (or the arms) of the T shape, which is also softened by the effect of this heating.

This results in enlargement of this lower part of the rib and reduction of the width of the surfaces 34 and 35; the duration and the temperature of heating the film lid, the magnitude of the force pressing the film lid onto the rim, the width of the surfaces 34, 35, and the vertical distance 38 are all chosen so that deformation at the upper end of the rim during heat-sealing does not cause enlargement of the rim and does not cause the softened material of the rib to overflow beyond the surfaces 34, 35, which would make the glass less user friendly.

Accordingly, with the connecting surface 50, the two surfaces 34, 35 determine a receiver space (or volume) on either side of the rib, in line with the lower portions of the rib forming the crossbar of the T shape, and set back from the top and the portion 51 of the rib, to receive the plastics material that creeps upon the flattening of the rib caused by the heat-sealing process.

When sealing a film lid to the rim, the central portion 51 may thus disappear completely (see FIG. 4), or only in part (see FIG. 5), in particular if the upper end of the central portion is not perfectly flat.

In the sealing configuration shown in FIG. 4, the film lid 40 includes a metal central layer 42, in particular a layer of aluminum, the thickness 46 of which may be of the order of 30 micrometers to 60 micrometers, for example; the outside face of the layer 42 is coated with a layer 41 that may be a lacquer or a film of plastics material, in particular a polyester film adhering to the layer 42.

The layer 42 is moreover coated on its inside face (which is also its lower face in relation to the disposition shown in the figures) with a layer 43 of thickness 47 that may consist of a lacquer or a heat-sealing plastics material.

By means of the (deformed) T-shaped rib, the area of contact and sealing between the rim and the film lid is increased without the width (or thickness) 30 of the rim being increased (see FIG. 3).

Figure 8:
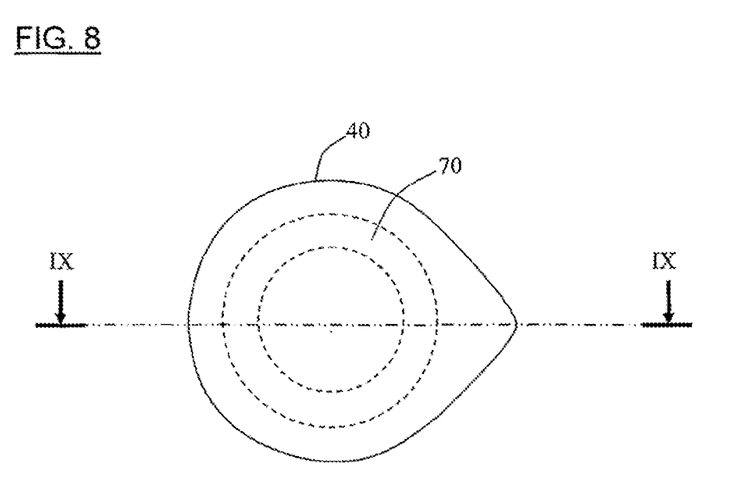
FIG. 8 is a diagrammatic plan view of a film lid of one embodiment of the invention.
Figure 9:
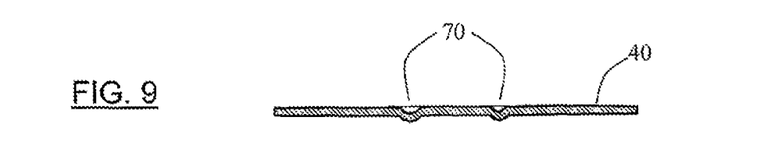
FIG. 9 is a diagrammatic view in section taken along the line IX-IX of the film lid shown in FIG. 8.

Referring to FIGS. 8 and 9, the film lid 40 includes a single centered circular deformation 70 having (in section) a half-wave profile and projecting from the lower face (inside face) of the film lid.

Figure 11:
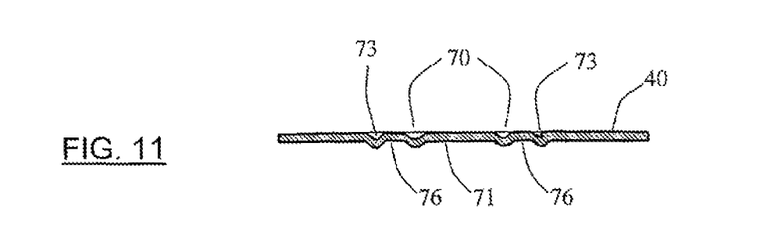
FIG. 11 is a diagrammatic view in section of a film lid of another embodiment of the invention.

In the configuration shown in FIG. 11, the film lid 40 includes two concentric circular deformations 70, 73 each having a half-wave profile and projecting from the inside face of the film lid.

Figure 10:
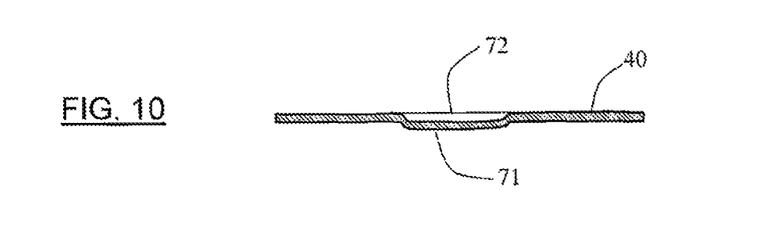
FIG. 10 is a diagrammatic view in section of the film lid shown in FIG. 9 having a central part that has been deformed by the effects of a reduced pressure on its lower face.
Figure 12:
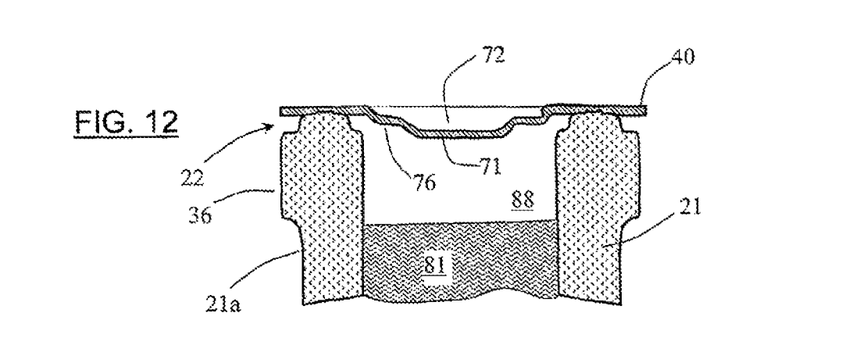
FIG. 12 is a diagrammatic view in section showing the attachment of the film lid from FIG. 11, having a central part that has been deformed, to the rim of a glass filled with wine, which is shown in part.
Figure 13:
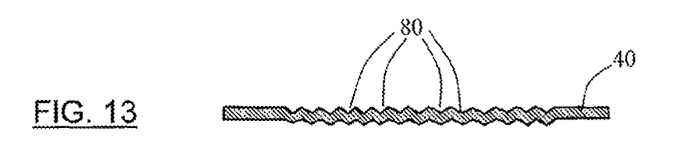
FIG. 13 is a diagrammatic view the film lid shown in FIG. 15 in section taken along the line XIII-XIII.

Referring to FIGS. 10 and 12, if the inside face of the film lid (sealed to a glass) is subjected to a sufficiently reduced pressure, the portions 71, 76 of the film lid respectively defined by the deformations 70, 73 are entirely deformed and project on the inside face of the film lid.

The result of this is the appearance of a cavity 72 over a substantial part of the outside (upper) face of the film lid, a reduction in the volume of the head space (88 in FIG. 12), and a limitation of the reduced pressure in the glass filled with wine 81.

Figure 14:
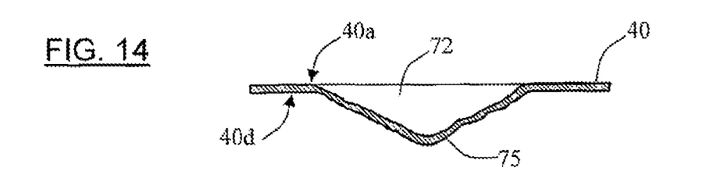
FIG. 14 is a diagrammatic view in section of the film lid shown in FIG. 13, having a central part that has been deformed by the effect of a reduced pressure.
Figure 15:
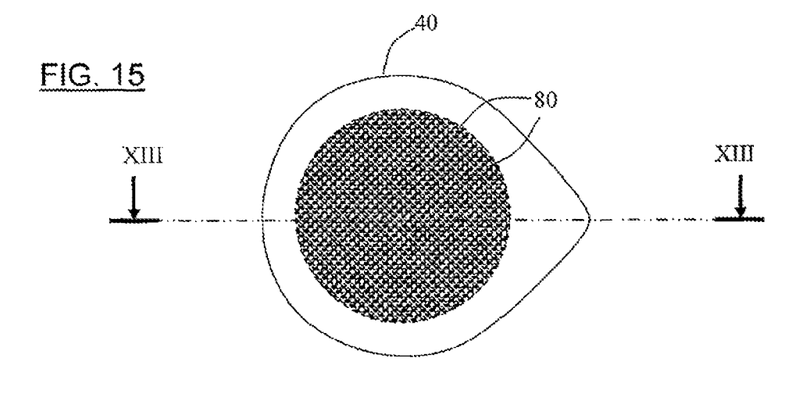
FIG. 15 is a diagrammatic plan view of a film lid of another embodiment of the invention.
Figure 16:
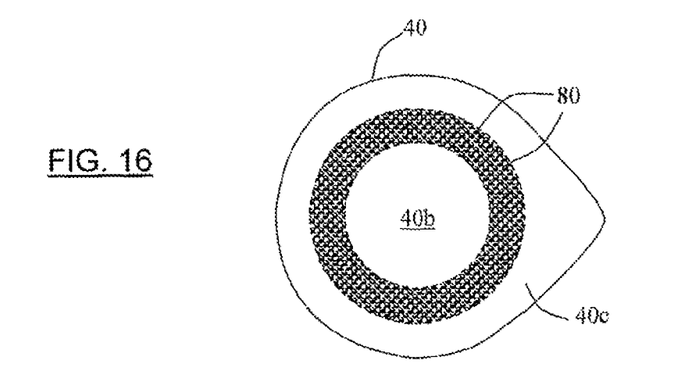
FIG. 16 is a diagrammatic plan view of a film lid of a further embodiment of the invention.

In the embodiments corresponding to FIGS. 13 to 16, the substantially plane film lid 40 includes many small deformations 80 regularly distributed over a substantial part of the film lid in the form of a disk (FIG. 15) or of a ring (FIG. 16).

These small deformations enable overall deformation 75 of the corresponding part of the film lid, with at least the central part thereof then assuming a dome shape projecting from the inside face 40d of the film lid as shown in FIG. 14 when this inside face is subjected to a sufficiently reduced pressure, and enable a depression 72 of substantial volume to be formed in the outside face 40a of the film lid.

These deformations 80, which may be obtained by embossing, may have a dimension of less than one millimeter, they may be of substantially identical shape, and they may be distributed at the rate of at least ten deformations per square centimeter of the surface of the film lid.

In the FIG. 16 configuration, a central part 40b of the film lid is free of such deformations 80; another peripheral part 40c (or ring) of the film lid is also free of deformations in order to improve the contact and adhesion between this peripheral part and the rim of the glass.

Reducing the volume of the head space 88 by deforming the film lid and/or the walls of the glass makes it possible to limit the reduced pressure in the closed glass to a value of the order of 0.03 bar to 0.3 bar (i.e. of the order of $3*10^3$ Pascal to $3*10^4$ Pascal), and in particular to a value situated in a range from approximately 0.1 bar to approximately 0.2 bar.

The deformation of the film lid and/or the walls of the glass 20 may result from a reduced pressure in the glass (and in the head space in particular) because of the effect of exchanges occurring between the wine and the gas mixture contained in the head space or of changes occurring in the wine over time.

This deformation may be initiated or amplified by pressure on the film lid and on the rim of the glass while sealing the film lid.

The invention claimed is:

1. A glass for use in combination with a film lid to package wine, the glass comprising a bottom, a sidewall extending from the bottom and terminating in a rim, the rim comprising first and second receiver surfaces and an annular rib of thermoplastic material disposed between the receiver surfaces, the rib being a unitary structure and having a cross section in the shape of an inverted T with arms of the T having uppermost portions that extend above the respective first and second receiver surfaces a first vertical distance and with a stem of the T having an uppermost portion that extends above the arms a second vertical distance, the rib being made of a thermoplastic material that is deformable such that, when subjected to a selected heat and compression transmitted from the film lid, the thermoplastic material of the rib melts with melted thermoplastic material from the stem flowing to the arms and melted thermoplastic material from the arms flowing to the respective first and second receiver surfaces resulting in flattening of the stem and reduction of a width of the respective first and second receiver surfaces, wherein the width of the first and second receiver surfaces and the first and second vertical distances are selected such that, when subjected to the selected heat and compression transmitted from the film lid, the stem is flattened and the width of the respective first and second receiver surfaces are reduced to enable attainment of a stage in which the stem is no longer distinguishable from the arms without enlargement of the rim and without softened thermoplastic material overflowing beyond the first and second receiver surfaces.

2. The glass according to claim 1, wherein the first vertical distance is greater than the second vertical distance.

3. the glass according to claim 1, wherein the bottom, the sidewall and the rim, including the rib, comprise a unitary structure and consist of the same thermoplastic material.

4. the glass according to claim 3, wherein the glass is made of polyethylene terephthalate and is produced by a process consisting of injection blow molding.

5. the glass according to claim 1, wherein the glass comprises means for conferring on the glass a capacity for elastic deformation to cause a reduction of a height of the glass when wine is stored in the glass, an inert gas is injected into a head space above the wine, the glass is closed by the film lid and is subjected to the a compression along a longitudinal axis of the glass.

6. The glass according to claim 5, wherein the means comprises a first portion of the sidewall having a first thickness and a second portion of the sidewall having a second thickness that is less than the first thickness, an area of the second wall portion being less than an area of the first wall portion.

7. the glass according to claim 1, wherein the rim includes a peripheral portion projecting relative to an outside face of the lateral wall to form a flange for receiving and extremity of a holding tool.

8. An apparatus comprising the glass according to claim 1, wine disposed within the glass and a film lid for sealing the glass, the film lid comprising a metal layer and means for facilitating deformation of the film lid when the film lid seals the glass and an inside face of the film lid is subjected to sufficiently reduce pressure.

9. The glass according to claim 1, wherein each of the first vertical distance and second vertical distance is less than 1 mm.

10. The glass according to claim 1, wherein each of the first vertical distance and second vertical distance is between 0.1 mm and 0.5 mm.

11. The glass according to claim 1, wherein the rim is disposed directly above, and in line with, an upper portion of the sidewall of the glass.

12. A method of packaging wine comprising the steps of:
(a) providing a glass for use in combination with a film lid to package wine, the glass comprising a bottom, a sidewall extending from the bottom and terminating in a rim, the rim comprising first and second receiver surfaces and an annular rib of thermoplastic material disposed between the receiver surfaces, the rib having a cross section in the shape of an inverted T with arms of the T having uppermost portions that extend above the respective first and second receiver surfaces a first vertical distance and with a stem of the T having an uppermost portion that extends above the arms a second vertical distance, the rib being made of a thermoplastic material that is deformable such that, when subjected to a selected heat and compression transmitted from the film lid, the thermoplastic material of the rib melts with the melted thermoplastic material from the stem flowing to the arms and the melted thermoplastic material from the arms flowing to the respective first and second receiver surfaces resulting in flattening of the stem and reduction of a width of the respective first and second receiver surfaces, wherein the width of the first and second receiver surfaces and the first and second vertical distances are selected such that, when subjected to the selected heat and compression transmitted from the film lid, the stem is flattened and the width of the respective first and second receiver surfaces are reduced without enlargement of the rim and without softened thermoplastic material overflowing beyond the first and second receiver surfaces;

(b) filling the glass with wine; and (c) sealing the glass with the film lid with injection of an inert gas or gases into a head space between the film lid and the wine, said sealing being performed by heating the film lid and compressing the heated film lid against the rib of the rim to cause the thermoplastic material to melt and to seal the film lid to the glass with flattening of the stem and without enlargement of the rim or overflow of thermoplastic material from the receiver surfaces.

13. A method of packing wine comprising the steps of:

(a) providing a glass for use in combination with a film lid to package wine, the glass comprising a bottom, a sidewall extending from the bottom and terminating in a rim, comprising first and second receiver surfaces and an annular rib of thermoplastic material disposed between the receiver surfaces, the rib having a cross section in the shape of an inverted T with arms of the T having uppermost portions that extend above the respective first and second receiver surfaces a first vertical distance and with a stem of the T having an uppermost portion that extends above the arms a second vertical distance, the rib being made of a thermoplastic material that is deformable such that, when subjected to s selected heat and compression transmitted from the film lid, the thermoplastic material of the rib melts with melted thermoplastic material from the stem flowing to the arms and melted thermoplastic material from the arms flowing to the respective first and second receiver surfaces resulting in flattening of the stem and reduction of a width of the respective first and second receiver surfaces, wherein the width of the fist second receiver surfaces and the first and second vertical distances are selected such that, when subjected to the selected heat and compression transmitted from the film lid, the stem is flattened and the width of the respective first and second receiver surfaces are reduced without enlargement of the rim and without softened thermoplastic material overflowing beyond the first and second receiver surfaces;

(b) filling the glass with wine; and (c) sealing the glass with the film lid with injection of an inert gas or gases into a head space between the film lid and the wine, said sealing being performed by heating the film lid and compressing the heated film lid against the rib of the rim to cause the thermoplastic material to melt and to seal the film lid to the glass with (a) flattening of the stem without enlargement of the rim or overflow of thermoplastic material from the receiver surfaces, and (b) deformation of the second portion of the sidewall to cause a reduction of a volume of the head space.

14. A method of packaging wine comprising the steps of:

(a) providing the apparatus according to claim 8; and (b) sealing the glass with the film lid with injection of an inert gas or gases into a head space between the film lid and the wine, said sealing being performed by heating the film lid and compressing the heated film lid against the rib of the rim to cause the thermoplastic material to melt and to seal the film lid to the glass, said compressing the heating film lid causing deformation of the film lid, formation of a cavity over an upper face of the film lid and a reduction in a volume of the head space.

\* \* \* \* \*